United States Patent
Guenther et al.

(10) Patent No.: US 7,699,727 B2
(45) Date of Patent: Apr. 20, 2010

(54) GAME BALL HAVING A THIN COVER AND METHOD OF MAKING SAME

(75) Inventors: Douglas G. Guenther, Wheaton, IL (US); Kevin L. Krysiak, Glenview, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 2048 days.

(21) Appl. No.: 10/431,722

(22) Filed: May 8, 2003

(65) Prior Publication Data

US 2003/0203780 A1    Oct. 30, 2003

Related U.S. Application Data

(63) Continuation of application No. 09/970,075, filed on Oct. 3, 2001, now abandoned.

(51) Int. Cl.
*A63B 39/06* (2006.01)
*A63B 39/00* (2006.01)

(52) U.S. Cl. .................. 473/604; 473/605
(58) Field of Classification Search ......... 473/604–611, 473/143–145; 269/129
See application file for complete search history.

(56) References Cited

U.S. PATENT DOCUMENTS

| | | | | |
|---|---|---|---|---|
| 5,181,717 A | * | 1/1993 | Donntag et al. | 473/605 |
| 5,306,002 A | * | 4/1994 | Meyer | 473/604 |
| 6,142,897 A | * | 11/2000 | Lees | 473/604 |
| 6,422,961 B1 | * | 7/2002 | Feeney | 473/604 |
| 6,645,099 B2 | * | 11/2003 | Gaff et al. | 473/596 |

* cited by examiner

*Primary Examiner*—Kien T Nguyen
(74) *Attorney, Agent, or Firm*—Terence P. O'Brien; John W. Chestnut

(57) ABSTRACT

A game ball is formed by molding a carcass in the final shape of the ball, spraying a mold surface with cover material, inserting the carcass into the mold, and molding the cover material onto the carcass.

15 Claims, 4 Drawing Sheets

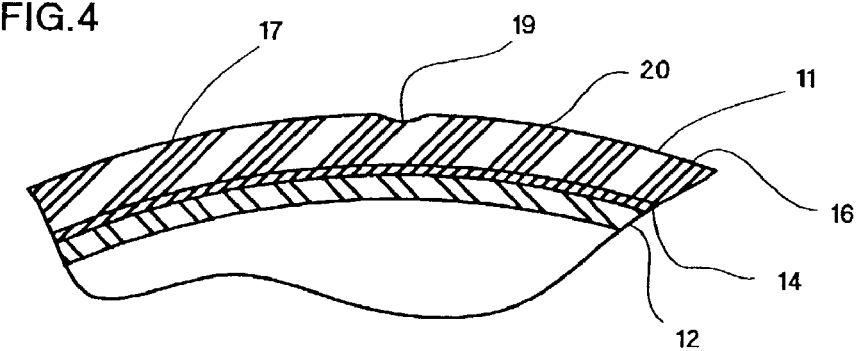
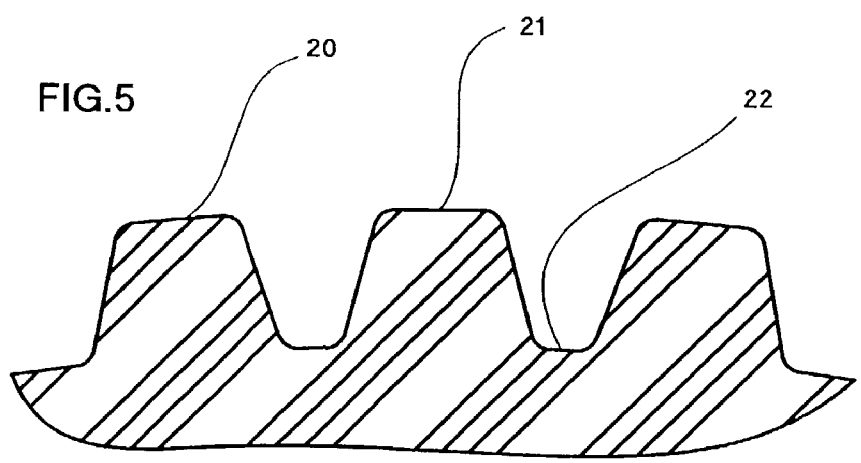
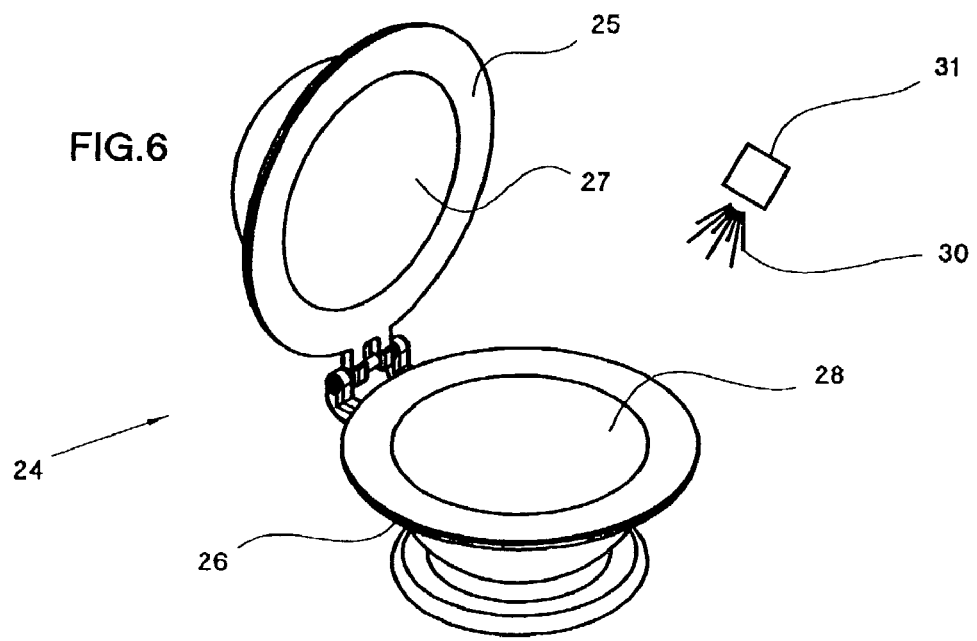

US 7,699,727 B2

GAME BALL HAVING A THIN COVER AND METHOD OF MAKING SAME

RELATED U.S. APPLICATION DATA

The present application is a continuation of U.S. patent application Ser. No. 09/970,075, entitled "Game Ball Having A Thin Cover And Method Of Making Same," filed on Oct. 3, 2001 now abandoned by Guenther et al.

BACKGROUND

This invention relates to game balls such as basketballs, footballs, soccer balls, and volley balls. More particularly, the invention relates to a game ball having a thin cover that is sprayed-on, dipped-on, or other wise applied to the ball.

Performance type basketballs, footballs, soccer balls and volley balls are traditionally made by forming a carcass, applying panels of cover material to the carcass, and molding the cover material onto the carcass.

For many years the most expensive high end basketballs used leather covers. Less expensive basketballs use covers made of synthetic leather. Prior art methods for forming basketballs, soccer balls, and volley balls and various cover material therefor are described in U.S. Pat. Nos. 6,024,661, 5,681,233, 5,580,049, 5,320,345, and 5,310,178. The '661, '049, and '178 patents describe synthetic leather cover materials which are formed from polyurethane and fibers.

As described in said patents, a basketball is conventionally made by first forming a carcass. The carcass includes an inflatable bladder, which is reinforced by a layer of thread, which is wound around the bladder. The carcass may be completed by applying panels of rubber to the thread-wound bladder and molding the resulting product under heat and pressure to fuse the rubber to the thread-wound bladder. Panels of cover material are applied to the carcass and secured to the carcass by molding under heat and pressure.

SUMMARY OF THE INVENTION

In accordance with the invention, a game ball is provided with a thin cover, applied via spraying, dipping, painting, electro-static painting, or other means. A carcass is molded into the final shape of the ball. The surfaces of a mold cavity of a two-part mold are sprayed with the cover material. The carcass is inserted into the mold, and the cover is molded onto the carcass to form the completed ball.

The invention produces high end performance game balls at significantly lower cost than prior art performance game balls.

DESCRIPTION OF THE DRAWING

The invention will be explained in conjunction with illustrative embodiments shown in the accompanying drawing, in which—

FIG. 4 is a fragmentary sectional view of the carcass taken along the line 4-4 of FIG. 3;

FIG. 5 is an enlarged fragmentary sectional view of the carcass showing a pebble configuration which is molded into the outer surface of the carcass;

FIG. 6 illustrates the step of spraying cover material onto the surfaces of a mold cavity of a two-part mold;

DESCRIPTION OF THE EMBODIMENTS

The invention will be explained with reference to a basketball 10 illustrated in FIG. 1. It will be understood, however, that the invention can be used with other inflatable game balls, for example, footballs, soccer balls, and volley balls.

Figure 2:
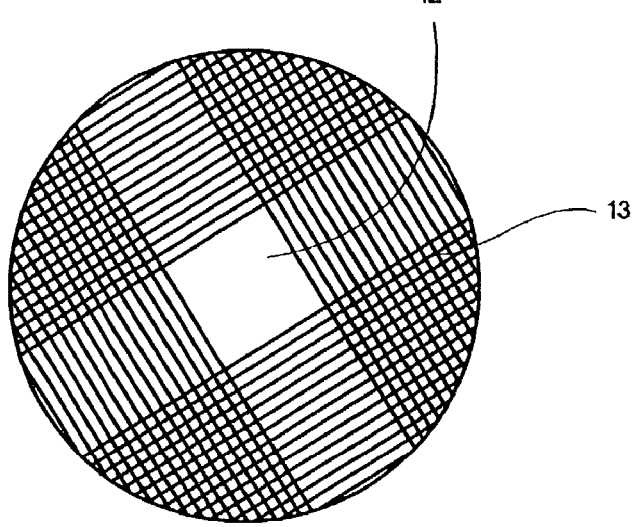
FIG. 2 illustrates a partially wound bladder which is used for forming a carcass of the basketball.
Figure 3:
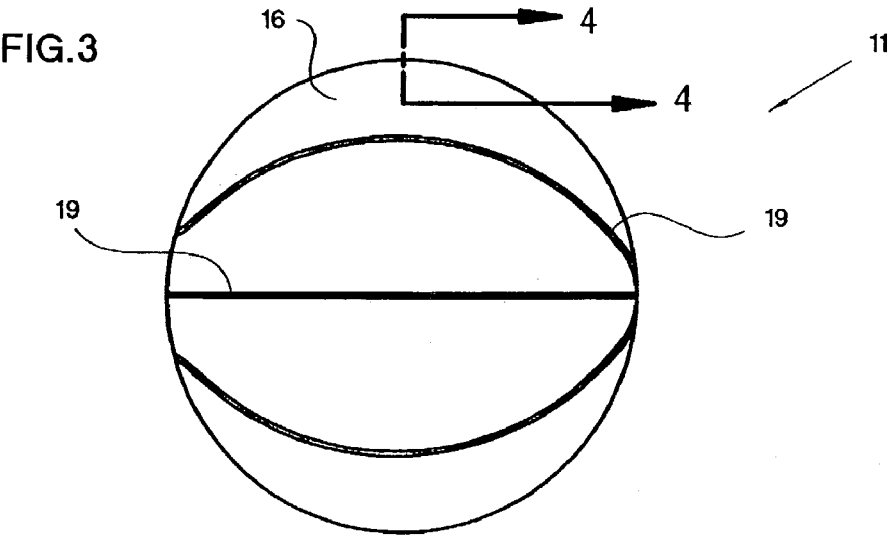
FIG. 3 illustrates the completed carcass including a plurality of channels and a pebbled outer surface.

Referring to FIGS. 3 and 4, the basketball 10 includes a carcass 11 that is molded into the shape of the completed basketball 10. The carcass 11 includes an inflatable bladder 12, a re-enforcing thread 13 (FIG. 2), and preferably, one or more sheets or panels 16. Referring to FIG. 2, the thread 13 is shown partially wound around the bladder 12. The bladder 12 can be formed from conventional bladder materials such as, for example, butyl rubber, natural rubber, a combination of butyl and natural rubber, and other elastic materials. In a particularly preferred embodiment, the bladder 12 is made of 80% Butyl rubber and 20% natural rubber. In a preferred embodiment, the thread 13 is substantially wound around the inflated bladder 12 to form a winding layer 14. The thread 13 can be conventional thread material such as, for example, 210 denier Nylon 66 thread, which is coated with latex or adhesive. Referring to FIGS. 2 and 4, the bladder 12 and the winding layer 14 form a wound bladder 15.

Referring to FIGS. 3 and 4, preferably, one or more sheets or panels 16 are laid over the wound bladder 15. The sheets or panels 16 are formed of an elastic material, preferably a butyl rubber/natural rubber combination. Other materials can also be used, such as, for example, a natural rubber, butyl rubber, a sponge rubber, or a combination thereof, as described in U.S. Pat. No. 5,681,233.

The wound bladder 15 with the laid-on panels 16 is inflated and then preferably placed in a spherical carcass mold 24 (FIG. 6) in which it is heated at about 160° C. to form the carcass 11.

Figure 7:
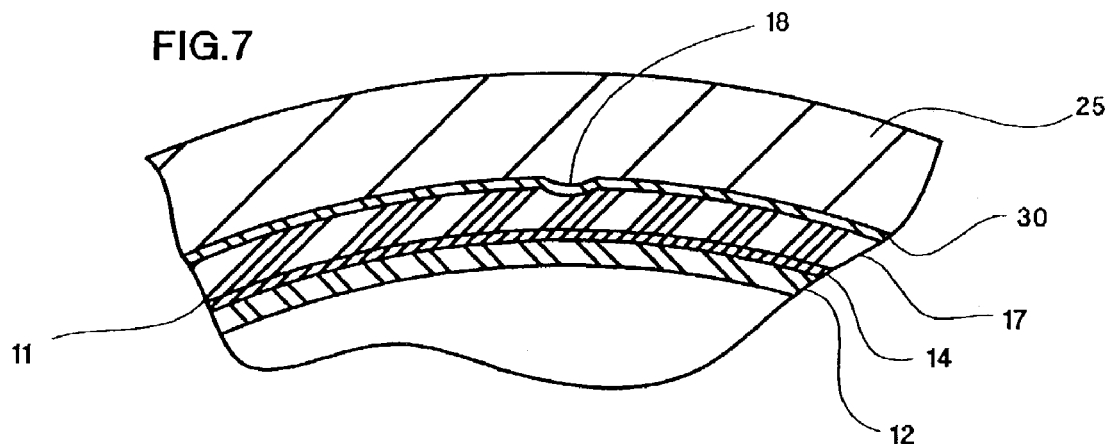
FIG. 7 is a fragmentary sectional view illustrating a cover being molded onto the carcass.

During the molding process, the rubber panels 16 fuse to each other and to the windings 14 to form an integral rubber layer 17 of the carcass 11. Referring to FIGS. 6 and 7, in a preferred embodiment, an inside surface of the carcass mold 24 includes inwardly extending projections 18 (FIG. 7) which form inwardly extending channels 19 in an outer surface 20 of the carcass 11.

The inside surface of the carcass mold 24 is also preferably provided with outwardly extending recesses that provide the outer surface 20 of the completed carcass 11 with a pebbled surface that duplicates the pebbled surface of conventional covers of basketballs. Referring to FIG. 5, the outer surface 20 of the carcass 11 includes outwardly projecting pebbles 21 that are separated by valleys 22.

Turning now to FIG. 6, the two-part mold 24 includes a top half 25 and a bottom half 26. Each half is provided with a hemispherical mold cavity 27 and 28, respectively. The surfaces of the mold cavities 27 and 28 have the same shape as the outer surface of the molded carcass 11. Alternatively, a first mold can be used to form the carcass 11 and a second mold can be used to form the completed ball 10 including the carcass 11 and a cover material. The cover material 30 is bonded to the carcass 11 without the use of a separate adhesive or adhesive agent. The cover material 30 is preferably sprayed, in liquid form, onto the interior surface of each of the mold cavities 27 and 28 by a sprayer 31. In alternative preferred embodiments, the cover material 30 can be applied in liquid form to the interior surface of the mold cavities 27 and 28 by other means, such as, for example, painting, brushing, or pouring. In alternative preferred embodiments, the cover material can be a powder or formed as pellets that are poured into, or otherwise inserted within, the mold cavities 27 and 28. In another preferred embodiment, the cover material can be injected, in liquid form, into the closed mold including the carcass 11.

The cover material 30 can be any suitable material that can cure, set, or harden on the carcass 11 to provide desirable properties of grip, feel, and durability. Urethane and plastic materials are particularly advantageous. In one specific embodiment, the cover material 30 is a polyurethane. The cover material 30 preferably has a density of between 2 and 12 kg/m$^2$.

After the cover material 30 is sprayed-on, or otherwise applied to, the mold cavities 27 and 28, the inflated carcass 11 is positioned in the mold 24 and the mold 24 is closed. The temperature of the mold 24 is preferably between 150 and 165° C., and the internal pressure of the bladder 12 is preferably between 100 to 120 psi.

Figure 8:
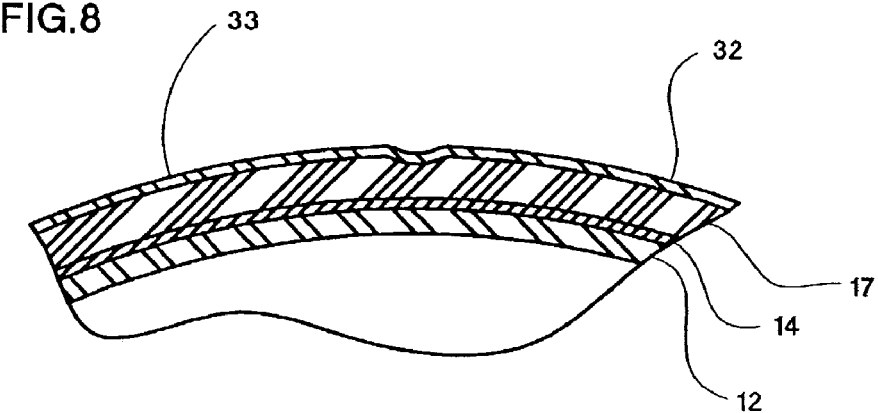
FIG. 8 is a fragmentary sectional view of the completed basketball taken along the line 8-8 of FIG. 1.

The ball 10 is preferably molded under heat for approximately 6 minutes as illustrated in FIG. 7. The molding step causes the cover material 30 to bond to the carcass 11 and to cure or harden to form a finished cover 32 (FIG. 8). The mold 24 is then opened, and the ball 10 is removed.

Figure 1:
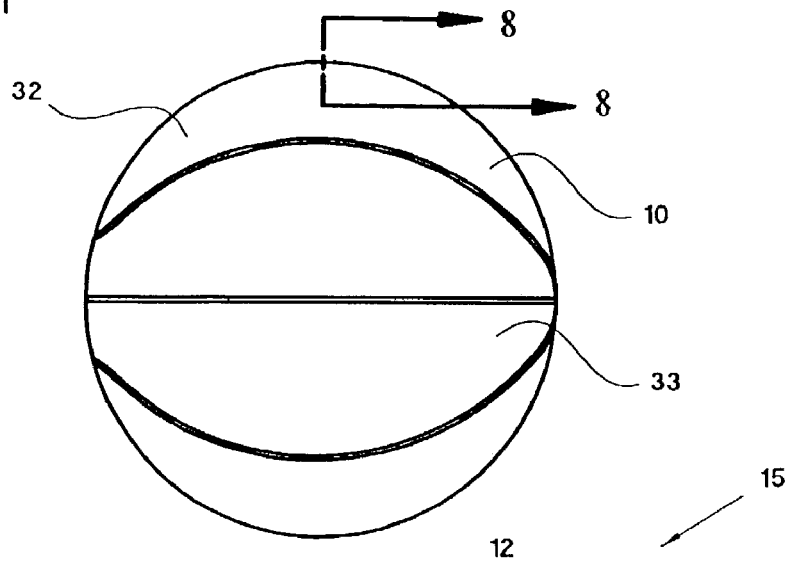
FIG. 1 illustrates a basketball formed in accordance with a preferred embodiment of the present invention.

The completed ball 10 is illustrated in FIGS. 1 and 8. The thickness of the cover 32 is advantageously between 0.1 mm and 2.0 mm. In a particularly preferred embodiment, the thickness of the cover between 0.2 mm and 0.75 mm. Preferably, an outside surface 33 of the cover 32 has the same contour as the outer surface 20 of the carcass 11, including the channels 19, the pebbles 21, and valleys 22.

Figure 9:
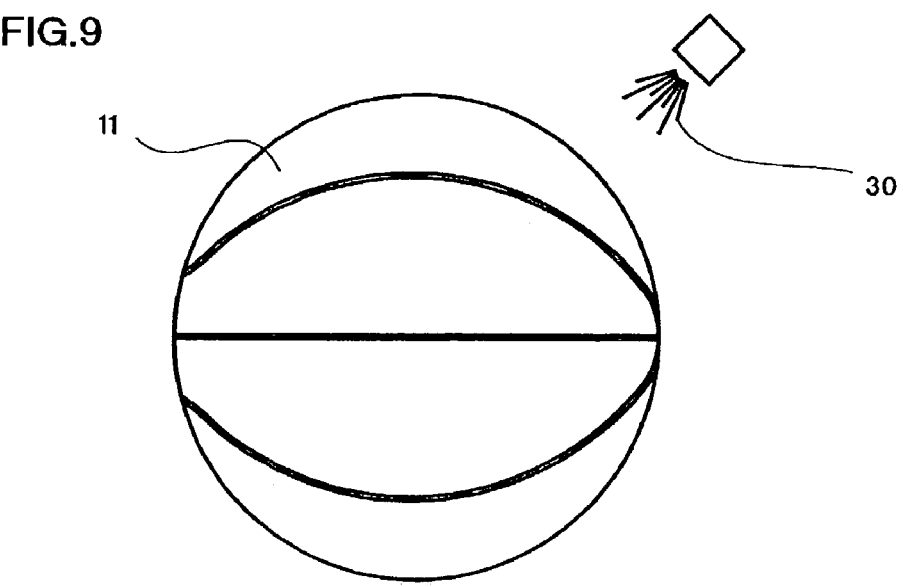
FIG. 9 illustrates an alternate embodiment of the invention in which the cover material is sprayed onto the carcass.

FIG. 9 illustrates an alternate embodiment of the invention, wherein instead of spraying the liquid cover material 30 onto the cavities 27 and 28 of the mold 24, the cover material 30 is sprayed directly onto the outer surface of the carcass 11. The carcass 11 and the cover material 30 are thereafter molded in mold 24 as previously described. In an alternative preferred embodiment, after the cover material 30 is sprayed on, or otherwise applied to, the carcass 11; the carcass 11 and the cover material 30 can be passed, using a conveyor belt or other means, through an oven.

Figure 10:
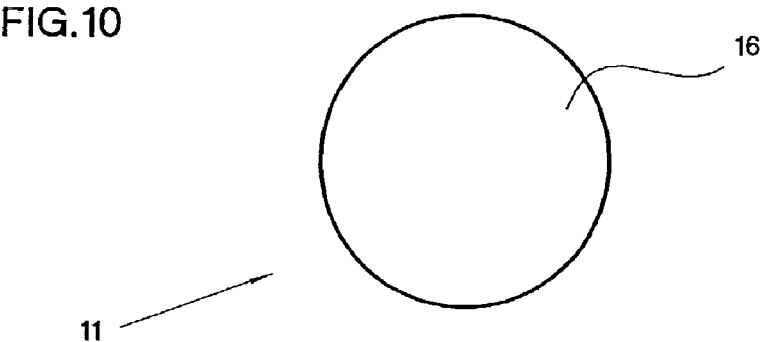
FIG. 10 illustrates an alternative preferred embodiment of a completed carcass.

Referring to FIG. 10, in an alternative preferred embodiment, the carcass 11 can be molded in a mold similar to the mold 24 but without forming the plurality of channels 19 and a pebbled outer surface. The mold without projections 18 and a pebbled contour can be used to produce a generally smooth spherical carcass 11. Then, after spraying-on, or otherwise applying, the cover material 30 to the carcass 11, a mold or other means can be used to form channels and a pebbled outer surface in the cover material 30.

Figure 11:
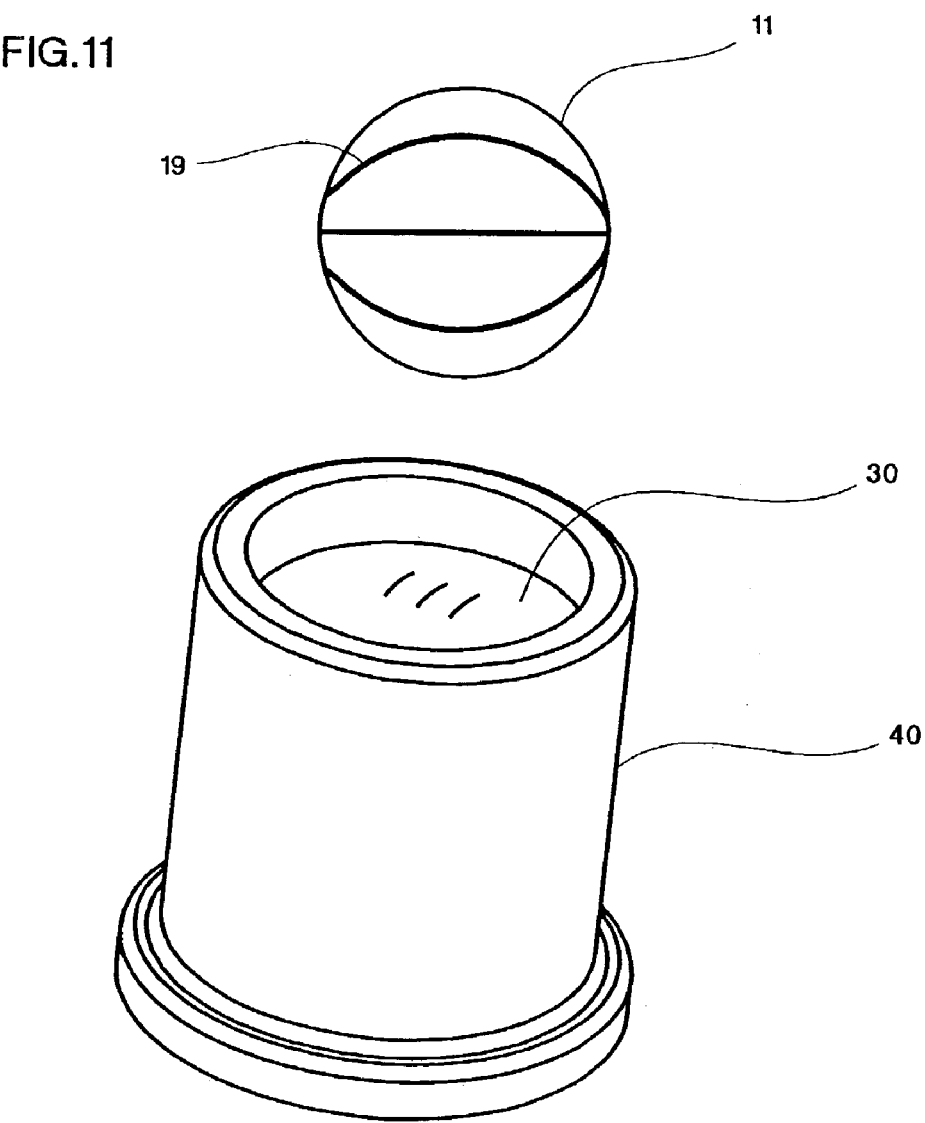
FIG. 11 illustrates another alternative embodiment of the invention in which a carcass is dipped into a container of cover material in liquid form.

Referring to FIG. 11, another alternative preferred embodiment of the present invention is illustrated. A container 40 sufficiently sized to receive at least one inflated carcass 11 is at least partially filled with the cover material 30. The cover material 30 is preferably heated to a liquid state either just prior to being placed in the container 40 and/or while in the container 40. At least one carcass 11 is then preferably positioned in the liquid cover material 30 of the cavity 40. After the predetermined amount of time, the at least one carcass 11 is separated from the container 40. This application method can be referred to as dipping. The carcass 11 including the liquid cover material 30 can then be transferred to a mold, such as mold 24, or passed through an oven, to form a completed ball 10.

In other alternative embodiments, the cover material 30 can be applied to the carcass 11 using other means, such as for example, painting, brushing, or electro-static painting. To use electro-static painting, an electric charge is created on the carcass 11 and/or in the cover material 30 causing the cover material 30 to be drawn to the carcass 11. One method of developing such a charge includes inserting magnetic particles into one or both of the cover material 30 and the carcass 11. Upon curing, magnetic particles can be removed from the ball.

The invention can also be used on other game balls such as footballs, soccer balls, and volley balls. Appropriate modifications can be made in the carcass or the surface texture of the balls. For example, the carcass of a football can be formed without a layer of windings or without one or more panels. Also, the outer surface of the game ball, such as a soccer ball or a volley ball, can be smooth rather than pebbled.

While in the foregoing specification a detailed description of a specific embodiment of the invention was set forth for the purpose of illustration, it will be understood that many of the details hereingiven may be varied considerably by those skilled in the art without departing from the spirit and scope of the invention.

What is claimed is:

1. A game ball comprising:
 a spherical carcass including;
  a bladder,
  a layer of windings surrounding the bladder, and
  an integral layer of elastic material surrounding the layer of windings, the carcass having an outer surface, and at least a portion of the outer surface including a pebbled texture, and
 a one-piece cover surrounding, and directly bonded to, the carcass without an adhesive, the cover having a thickness less than 0.5 mm.

2. The game ball of claim 1, wherein the cover is formed of a polyurethane.

3. The game ball of claim 1, wherein the layer of windings is formed of at least one thread wound around the bladder.

4. The game ball of claim 1, wherein the integral layer is formed from a plurality of panels molded over the bladder and the layer of windings.

5. The game ball of claim 1, wherein the elastic material of the integral layer is selected from the group consisting of butyl rubber, natural rubber, sponge rubber and combinations thereof.

6. The game ball of claim 5, wherein the layer of the elastic material is non-fibrous.

7. The game ball of claim 1, wherein the one-piece cover is non-stitched.

8. The game ball of claim 1 wherein the cover layer is formed of a material having a density between 2.0 and 12.0 kg/m$^3$.

9. A game ball comprising:
 a carcass having an outer surface, and at least a portion of the outer surface including a pebbled texture; and
 a cover layer substantially surrounding and directly contacting the carcass, the cover layer having a thickness within the range of 0.2 and 0.75 mm, the cover layer being selected from the group consisting of a sprayed-on cover, a painted-on cover, an electro-statically painted-on cover, a brushed-on cover, a dipped-on cover, and combinations thereof, the cover layer is formed of a material having a density between 2.0 and 12.0 kg/m$^3$, the cover layer being formed of a material selected from the group consisting of a urethane, a polyurethane, a plastic, and combinations thereof.

10. The game ball of claim 9, wherein the cover layer is a non-stitched, one-piece layer.

11. The game ball of claim 9 wherein the cover layer is formed around the carcass without the use of an adhesive agent.

12. The game ball of claim 9 wherein the carcass is generally spherical.

13. The game ball of claim 9, wherein the carcass has an outer surface, and wherein at least one channel is formed into the outer surface.

14. The game ball of claim 9, wherein the cover layer is configured to conform to the outer surface of the carcass.

15. The game ball of claim 9, wherein the game ball is selected from the group consisting of a basketball, a football, a soccer ball and a volleyball.

* * * * *